United States Patent [19]
Morita

[11] Patent Number: 5,551,291
[45] Date of Patent: Sep. 3, 1996

[54] TONE WHEEL FOR ROTATIONAL SPEED DETECTION UNIT

[75] Inventor: Kouichi Morita, Yokohama, Japan

[73] Assignee: NSK Ltd, Tokyo, Japan

[21] Appl. No.: 400,986

[22] Filed: Mar. 8, 1995

[30] Foreign Application Priority Data

Mar. 8, 1994 [JP] Japan .................... 6-037015

[51] Int. Cl.⁶ .................... G01P 1/02
[52] U.S. Cl. .................... 73/494; 73/514.39; 310/168
[58] Field of Search .................... 73/116, 117.3, 73/494, 514.39, 520.01; 324/173, 174, 207.25; 310/168, 154, 155

[56] References Cited

U.S. PATENT DOCUMENTS 3,936,684  2/1976  Anselmino .................... 310/168
5,053,656  10/1991 Hodge .................... 310/16 B

FOREIGN PATENT DOCUMENTS 4231332   4/1993  Germany.
1-156463  10/1989 Japan.

Primary Examiner—Hezron E. Williams
Assistant Examiner—Christine K. Oda
Attorney, Agent, or Firm—Helfgott & Karas, P.C.

[57] ABSTRACT

A tone wheel made by press-forming a magnetic metal plate, has an annular portion and a plurality of fingers which are arranged in comb teeth fashion on an outer peripheral rim of the annular portion, and formed by bending beck the magnetic metal plate through 180 degrees so as to be overlapped as two layers, so that there is a large change in magnetic flux density as the tone wheel rotates past an opposing sensor, thereby increasing the amount of change in the sensor output signal.

1 Claim, 5 Drawing Sheets ns. 5,551,291

TONE WHEEL FOR ROTATIONAL SPEED DETECTION UNIT

BACKGROUND OF THE INVENTION

The present invention relates to a tone wheel or pulse ring for a rotational speed detection unit, used for detecting the rotational speed of a vehicle wheel, or a rotating shaft of a machine tool, or the like.

DESCRIPTION OF THE RELATED

An automotive vehicle wheel must be supported so as to rotate freely relative to a suspension unit, and also enable control of an anti-look braking system (ABS) or a traction control system (TCS). To achieve this it is known to assemble a rotational speed detection unit into a rolling bearing unit which supports the wheel, so that the rotational speed of the wheel can be detected.

FIG. 1 shows one of such known rolling bearing units, being disclosed in Japanese Patent First Publication Kokai NO- 1-156463. This unit has a rotating hub 2 which rotates together with a wheel, a pair of inner rings 1 which are externally fitted to the rotating shaft 2 and respectively formed with inner ring raceways 3 on the outer peripheral faces thereof, and an outer ring 4 which does not rotate during use. The pair of inner rings 1 are axially juxtaposed as inner rings 1a, 1b, in FIG. 1. The outer ring 4 is fixedly attached to a support portion 6 of a suspension unit by means of an attachment flange 5 formed on an outer peripheral face thereof, and formed with a pair of outer ring raceways 7 on an inner peripheral face thereof. A plurality of balls 8 are provided between the respective outer ring raceways 7 and the inner ring raceways 3, so that the hub 2 is supported so as to be freely rotatable inside the outer ring 4. The vehicle (not shown) wheel is fixedly attached to a flange 9 which is provided on an outer peripheral face of the hub 2.

Respective seal rings 10a, 10b are fitted by press fitting a metal shell or core 11 which constitutes part of the respective seal ring 10, into inner peripheral faces at both axial ends of the outer ring 4. In this condition an inner peripheral rim of a resilient material 12 such as synthetic rubber which constitutes part of the seal ring 10a on the axially outer side is rubbingly engaged with the outer peripheral face of the inner ring 1a, while an inner peripheral rim of a resilient material 12 such as synthetic rubber which constitutes part of the seal ring 10b on the axially inner side is rubbingly engaged with the outer peripheral face of the base end of the tone wheel 30 which is externally fitted to the inner ring 1b. Here "axially outer side" means the side towards the outside in a widthwise direction when fitted to a vehicle; the left hand side in FIG. 1, while "axially inner side" means the side towards to the centre in the widthwise direction of the vehicle.

The tone wheel or pulse ring 30 is made by press forming a steel plate into an overall annular shape of crank shape in cross section. A radially inner cylindrical portion 14 formed on the radially inner side is externally fitted onto the inner ring 1b on the axially inner side. The peripheral rim of the resilient member 12 of the seal ring 10b on the axially inner side is sealingly fitted to the outer peripheral face of the radially inner cylindrical portion 14. A radially outer cylindrical portion 15 formed on the radially outer side has a plurality of through-apertures 16 formed therein at even spacing around a circumferential direction thereof. The magnetic characteristics of the radially outer cylindrical portion 15 thus change alternately in the circumferential direction. To complement this, a sensor 17 is supportedly fixed to a part of the support portion 6 with a detection portion thereof disposed opposite to the outer peripheral face of the radially outer cylindrical portion 15.

With the rotational speed detecting unit as described above, when the hub 2 rotates with rotation of the wheel (not shown), the tone wheel 30 which is fixed to the hub 2 by means of the inner ring 1b, rotates at the same speed as the wheel. As a result the output from the sensor 17 which is faced to the radially outer peripheral face of the outer cylindrical portion 15 of the tone wheel 30 changes. Since the frequency of this change in output is proportional to the rotational speed of the wheel, then if the output is input to a control unit (not shown), the rotational speed of the wheel can be obtained to thus control the ABS and TCS appropriately.

A unit of a construction such as shown in FIG. 2 is also known for a rotational speed sensing unit, for detecting the rotational speed of an axle of 8 large sized vehicle, or a rotating shaft of a machine tool. With this unit, an axle or rotating shaft 18 is supported so as to rotate freely inside a housing (not shown) by means of ball bearings 20. An inner ring 1 for the ball bearings 20, rotates together with the axle or rotating shaft 18, while an outer ring 4 does not rotate. A tone wheel 30 is externally fitted to an end portion of the inner ring 1 to constitute one of the various components making up the rotational speed detecting unit for detecting the rotational speed of the axle or rotating shaft 18, while a sensor 40 is retained inside a cover 41 externally fitted to the outer ring 4.

The tone wheel 30 is made by press forming a magnetic metal plate such as a steel plate into an overall annular shape of "L" shape in cross section to have a cylindrical annular portion 31 and a disc shape portion 32. The cylindrical annular portion 31 is formed on a radially inner peripheral rim side and externally fitted onto the inner ring 1. Moreover, the disc shape portion 32 is bent radially outward from a rim on one axial end of the cylindrical annular portion 31, and has an outer peripheral rim thereof formed with a plurality of cut-outs 33 as shown in FIG. 3, at an even spacing around a circumferential direction thereof. Accordingly, at the outer peripheral rim of the disc shape portion 32 there are arranged intermittently in the circumferential direction, comb like fingers 34 protruding in a radially outward direction therefrom.

The sensor 40 has a permanent magnet 28 and a Hole element 29 which is arranged to be faced to the side face of the disc shape portion 32. The magnetic flux output from the permanent magnet 28 passes through the Hole element 29. The density of the magnetic flux becomes higher when the Hole element 29 is opposite to any of the fingers 34 and becomes lower when opposite to any of the cut-outs 33. The output from the sensor 40 assembled with the Hole element 29 thus varies with rotation of the tone wheel 30. The frequency of this variation is proportional to the rotational speed of the axle or rotating shaft 18, in a similar manner to the case of the first example construction shown in FIG. 1.

The sensor for detecting rotational speed, and incorporating a tone wheel with differing magnetic properties around a circumferential direction thereof, may have instead of the Hole element, a permanent magnet and an iron core wound with a coil.

With such a sensor also, the output varies with a frequency proportional to the rotational speed.

With the conventional tone wheel fitted into a rotational speed sensing unit constructed and used as described above, there are the following problems to be addressed. That is to say, in order to make the change in the output of the sensor 40 large to enable accurate detection of the rotational speed of the member fixed to the tone wheel 30, it is effective to have a large change in the density of the magnetic flux which passes through the sensor 40 with rotation of the tone wheel 30. To ensure this large change in magnetic flux density, it is effective to have a large thickness dimensions for the tone wheel 30.

However, if the thickness dimension for the magnetic metal plate forming the tone wheel is simply made larger, the bending process in manufacture becomes difficult, giving rise to problems in obtaining sufficient dimensional accuracy, as well as problems due susceptibility to tearing or cracking in the region of bending. For this reason it has been customary to have a maximum thickness for the magnetic metal plate forming the tone wheel 30 of approximately 1 mm. However when small sized devices are used for the sensor 40, it is not always possible to obtain a sufficiently large output.

Therefore it has heretofore been considered to overlap two magnetic metal plates to give a tone wheel with a greater overall plate thickness. With such a construction however, there is an increase in the number of structural components for the tone wheel, so that parts management and assembly operations become complicated, resulting in an increase in manufacturing costs for the rotational speed detection unit. For this reason it is desirable to realize a tone wheel enabling a sufficiently large output yet with a simple construction.

SUMMARY OF THE INVENTION

A tone wheel for a rotational speed detection unit according to the present invention has been developed in view of such circumstances. This tone wheel is manufactured, as with the beforementioned conventional tone wheel for a rotational speed detection unit, by bend-forming a magnetic metal plate. Moreover it comprises an annular portion adapted to be supported by a rotating member, and a plurality of fingers protruding in comb teeth fashion from a rim of the annular portion, and arranged intermittently in a circumferential direction therearound.

In particular, with this tone wheel, the fingers are made by bending back the magnetic metal plate through approximately 180 degrees so as to be overlapped as two or more layers, whereby a thickness of the fingers is two or more times the thickness of the magnetic metal plate.

Other objects and aspects of the present invention, will become apparent from the following description of embodiments given in conjunction with the appended drawings.

BRIEF DESCRIPTION OF THE DRAWINGS

Now, some preferred embodiments are shown referring to the drawings. Like numerals correspond to like elements throughout the specification and drawings.

DESCRIPTION OF THE PREFERRED EMBODIMENTS

Figure 3:
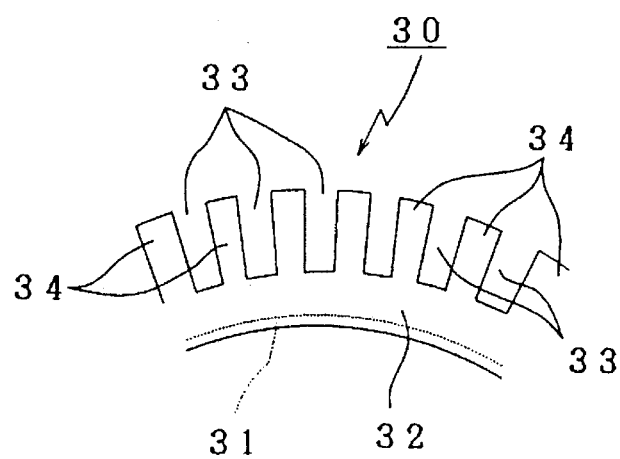
FIG. 3 is a side view of a part of a conventional tone wheel as viewed from the right side of FIG. 2.
Figure 4:
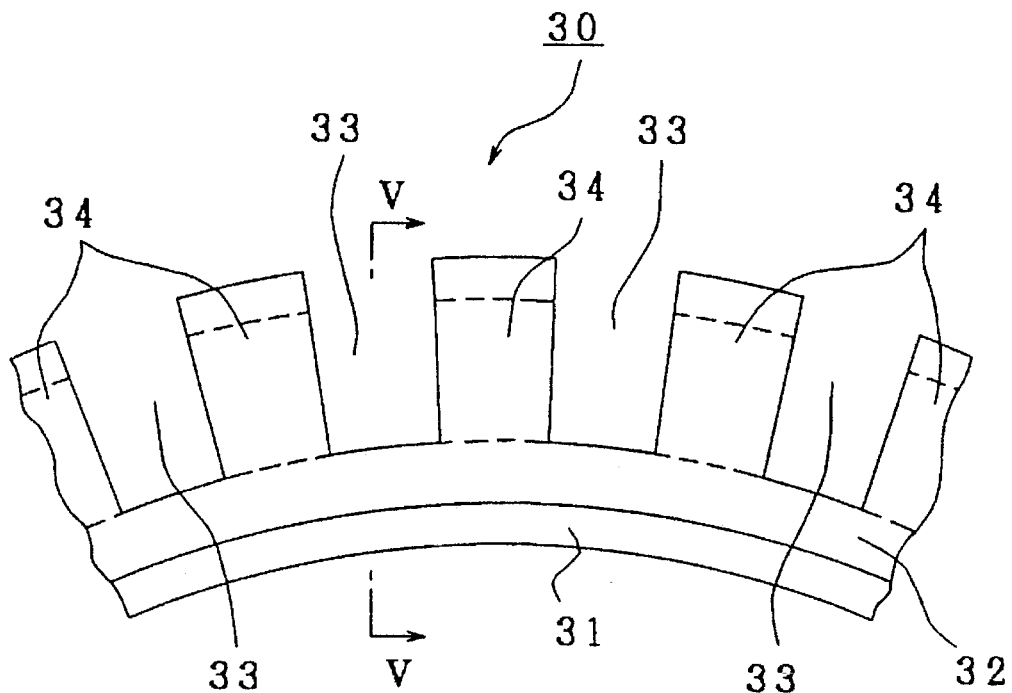
FIG. 4 is a side view showing a part of a first example of the present invention.
Figure 5:
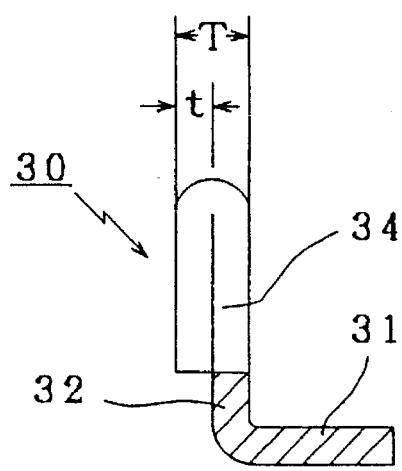
FIG. 5 is a cross sectional view on section V—V of FIG. 4.

A first embodiment of the present invention is shown FIGS. 4 and 5. A tone wheel 30 according to the present invention, as with the beforementioned conventional tone wheel 30 shown in FIGS. 2 and 3, is made by press-forming a magnetic metal plate such as a steel plate into an overall annular shape of "L" shape in cross section to have a cylindrical shaped annular portion 31 and a disc shape portion 32.

Figure 1:
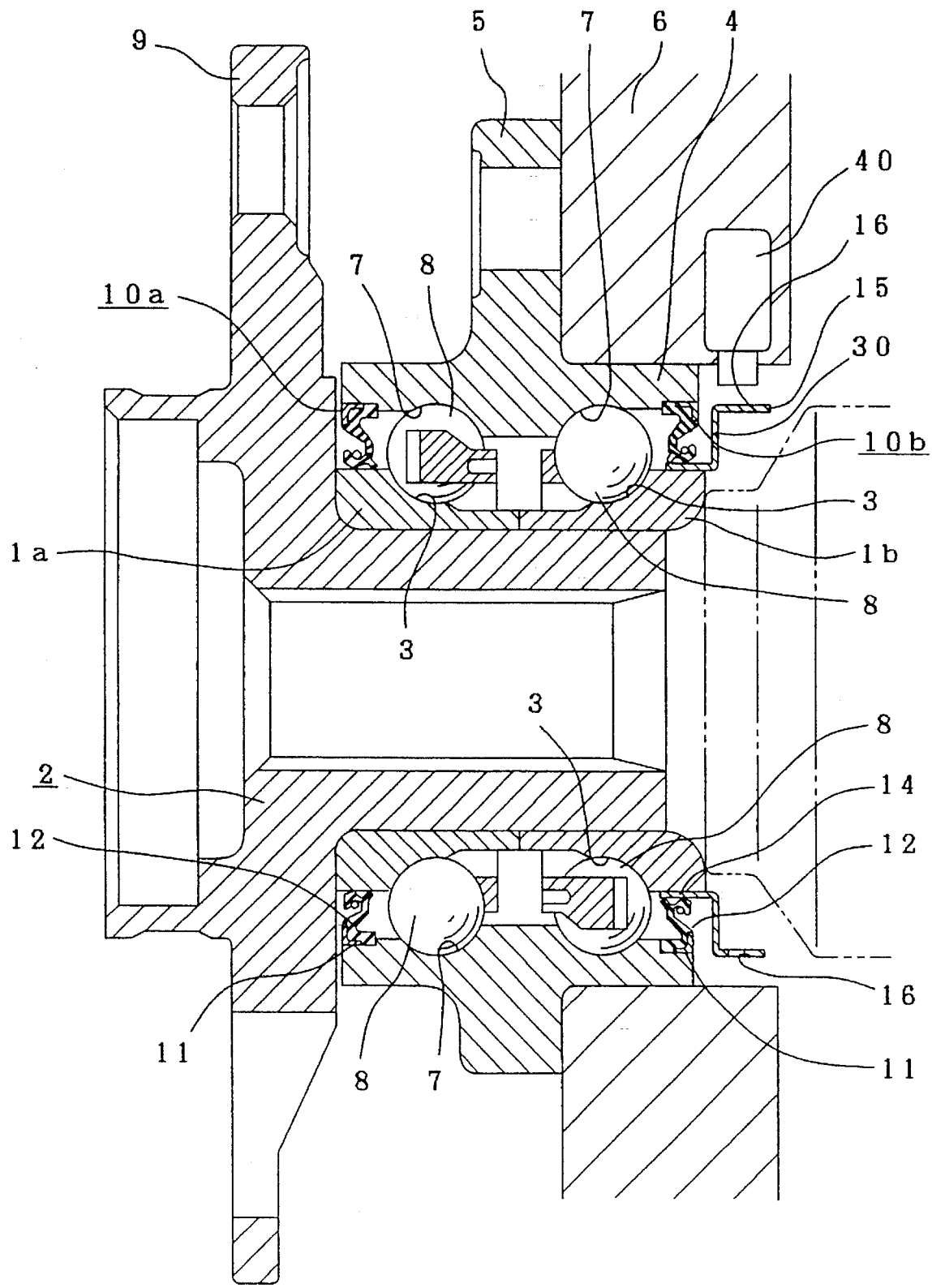
FIG. 1 is a cross sectional view showing a first example of a conventional construction.
Figure 2:
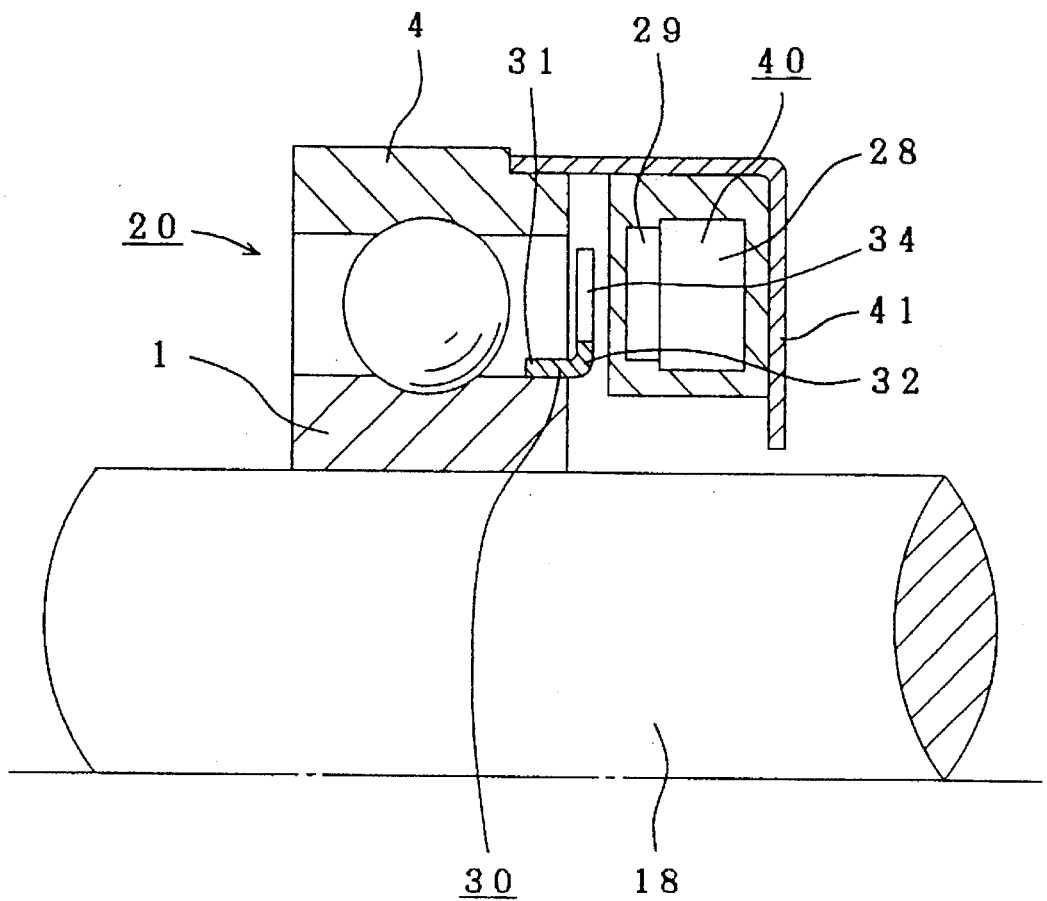
FIG. 2 is a half cross sectional view showing a second example of a conventional construction.

The cylindrical shaped annular portion 31 is formed on an inner peripheral rim side of the tone wheel 30 so that the tone wheel 30 can be externally fixed as required to a rotating shaft 18 such as the inner ring 20 of FIG. 2. Moreover, the disc shape portion 32 is bent radially outward from a rim on one end (the left end in FIG. 5) of the cylindrical annular portion 31, and has an outer peripheral rim thereof formed with a plurality of cut-outs 33 at an even spacing around a circumferential direction thereof. Accordingly, at the outer peripheral rim of the disc shape portion 31 there are arranged intermittently in the circumferential direction, comb like fingers 34 protruding in a radially outward direction therefrom.

In particular, with the tone wheel 30 according to the present invention, the fingers 34 ere made by bending back the magnetic metal plate through 180 degrees That is to say, the fingers 34 are each formed by overlapping two layers of the magnetic metal plate as shown in FIG. 5. As a result, the thickness T of the fingers 34 is twice the thickness t of the magnetic metal plate (T=2t).

The tone wheel 30 according to the present invention constructed as described above, as with the beforementioned conventional tone wheel shown in FIGS. 2 and 3, is externally fixed to the inner ring or rotating member 1 by mounting the cylindrical annular portion 31 on the outer peripheral face of the inner ring 1. Moreover, the rotational speed detection unit is constructed so that the detection portion of the sensor 40 mounted on the outer ring or non-rotating member 4 is faced to the plurality of fingers 34.

With the rotational speed detection unit of this construction, when the inner ring 1 rotates, the fingers 34, and the cut-outs 33 between and adjacent to the fingers 34, alternately pass in the vicinity of the detection portion. As a result the magnetic flux density inside the sensor 40 changes, so that the output of the sensor 40 changes. Since the thickness T of the fingers 34 is twice the thickness t of the magnetic metal plate making up the tone wheel 30, the amount of change in magnetic flux density is increased, so that the change in output of the sensor 40 is also increased. As a result the rotational speed of the inner ring 1 can be accurately detected.

Figure 6:
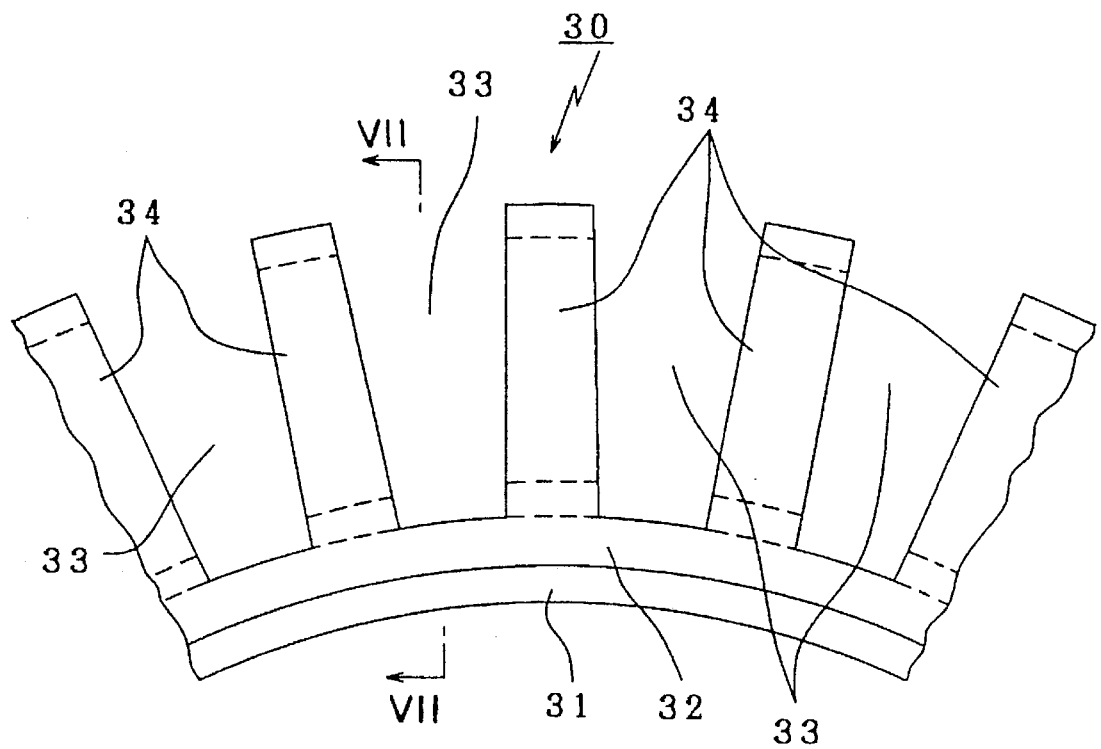
FIG. 6 is a side view showing a part of a second example of the present invention.
Figure 7:
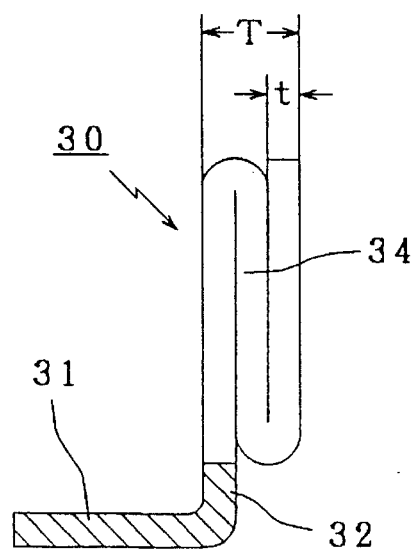
FIG. 7 is a cross sectional view on section VII—VII of FIG. 6.

A second embodiment of the present invention is shown FIGS. 6 and 7. With this embodiment, the portion forming the fingers 34 on a part of the magnetic metal plate making up the tone wheel 30, is bent back two times through 180 degrees onto itself, so that the magnetic metal plate part at the fingers 34 is overlapped three times as shown in FIG. 7. As a result, with this embodiment, the thickness T of the fingers is three times the thickness t of the magnetic metal plate (T=3t). Other details of the construction and operation are substantially the same as for the above mentioned first embodiment.

It will be noted that with both of the beforementioned first and second examples, the present invention is applicable to constructions wherein the sensor 40 is faced to the tone wheel 30 from the thrust direction as in FIG. 2.

Figure 8:
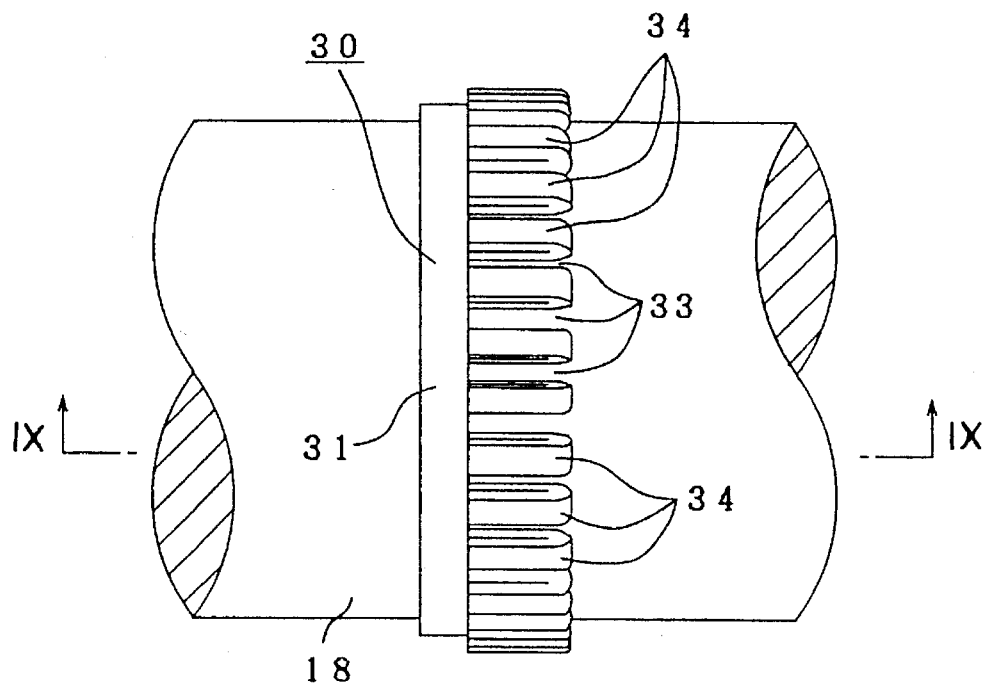
FIG. 8 shows a third embodiment of the present invention externally fitted to a rotating shaft.
Figure 9:
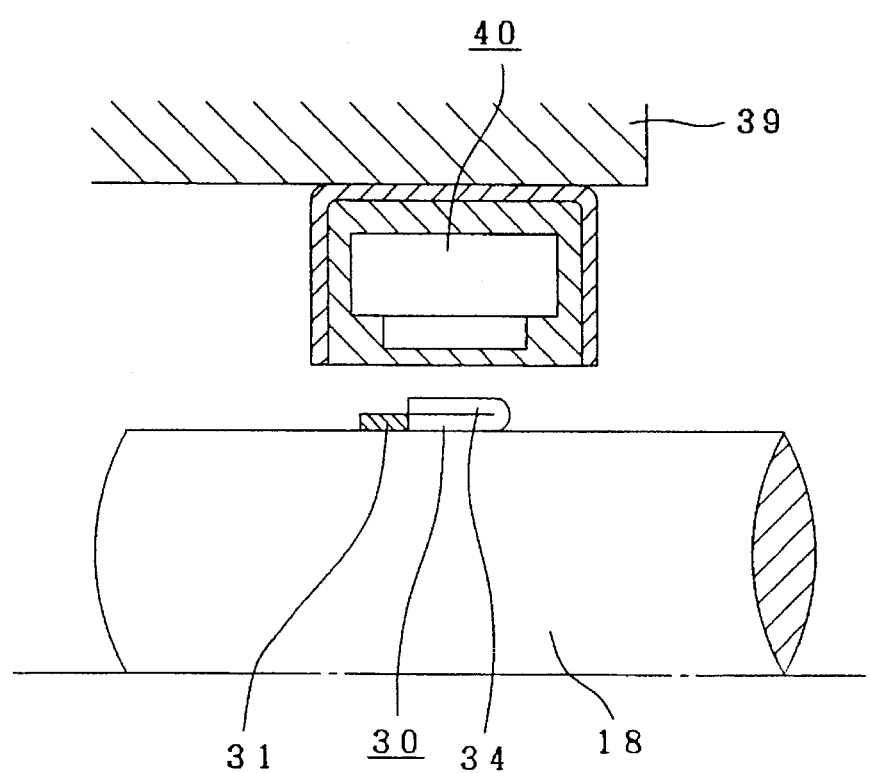
FIG. 9 is a cross sectional view corresponding to section IX—IX of FIG. 8, showing a sensor in position.

FIGS. 8 and 9 show a third embodiment of the present invention, This embodiment is applicable to the case where the sensor is faced to the tone wheel in the radial direction. Therefore the tone wheel 30 of this embodiment, is formed in an overall annular shape, and comprised of an annular portion 31 on one axial side externally fixed to a rotating shaft 18, and a plurality of fingers 34 on the other axial side (right end in FIGS. 8 and 9) protruding from the end of the annular portion 31. The fingers 34, which are arranged in the form of a comb around the circumferential direction, are formed by bending back the magnetic metal plate through 180 degrees so that the magnetic metal plate is overlapped as two layers.

As shown in FIG. 9, a sensor 40 which is internally fitted to a housing 39 surrounding the rotating shaft 18, is positioned so as to be faced to the fingers 34 of the tone wheel 30 constructed as described above. Other details of the construction and operation are substantially the same as for the above mentioned first and second embodiments.

In operation, the tone wheel for a rotational speed sensing unit according to the present invention constructed as described above, as with the beforementioned conventional tone wheel for a rotational speed detection unit, is fixed to a rotating member by mounting the annular portion on the rotating member. Moreover, the rotational speed detection unit is constructed so that the detection portion of the sensor mounted on the non-rotating or stationary member is faced to the plurality of fingers. With this arrangement, when the rotating portion rotates, the magnetic flux inside the sensor changes as the fingers, and the portions between and adjacent to the fingers, alternately pass in the vicinity of the detection portion, so that the output of the sensor changes. Since the thickness of the fingers is two or more times that of the magnetic metal plate making up the tone wheel, the amount of change in magnetic flux density increased, so that the change in output of the sensor is also increased.

In the above description of the respective embodiments, the magnetic metal plate forming the fingers is bent through 180 degrees after forming the fingers. However instead of this, it is possible to punch out the fingers after bending the magnetic metal plate around its full periphery through 180 degrees. In this way any error in pitch of the adjacent fingers may be kept to a minimum.

With the tone wheel for the rotational speed detection unit according to the present invention constructed and used as described above, it is not necessary to assemble together several members, thus simplifying parts management and the assembly operation. Moreover, the change in output of the sensor can be increased. Consequently, a rotational speed detection unit of high detection accuracy can be produced at low cost.

What is claimed is:

1. A tone wheel for use in detecting a rotational speed of a rotating member, the tone wheel being made by bend-forming a magnetic metal plate, and comprising an annular portion supported by the rotating member and having a rim, and a plurality of fingers protruding in a comb teeth fashion from the rim of the annular portion and arranged intermittently in a circumferential direction therearound, the fingers having end portions bent approximately 180 degrees by bending the magnetic metal plate back so that each finger includes at least two layers overlapping each other, such that each of the fingers has a thickness of at least two times the thickness of the magnetic metal plate.

* * * * *